(12) United States Patent
Otsuka

(10) Patent No.: US 8,724,193 B2
(45) Date of Patent: May 13, 2014

(54) IMAGE FORMING DEVICE CREATING A PREVIEW IMAGE

(71) Applicant: Naoki Otsuka, Konan (JP)

(72) Inventor: Naoki Otsuka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/846,084

(22) Filed: Mar. 18, 2013

(65) Prior Publication Data

US 2013/0222872 A1    Aug. 29, 2013

Related U.S. Application Data

(63) Continuation of application No. 12/078,248, filed on Mar. 28, 2008, now Pat. No. 8,422,069.

(30) Foreign Application Priority Data

Mar. 30, 2007    (JP) ................................. 2007-091334

(51) Int. Cl.
*H04N 1/04* (2006.01)
*G06K 1/04* (2006.01)
*G06F 15/00* (2006.01)
*H04N 3/12* (2006.01)
*G06K 9/40* (2006.01)

(52) U.S. Cl.
USPC ............ 358/505; 358/474; 358/487; 358/2.1; 358/1.15; 358/1.9; 382/167; 382/240; 382/274; 709/228; 705/26

(58) Field of Classification Search
USPC .......... 358/1.15, 527, 474, 487; 382/167, 240
See application file for complete search history.

(56) References Cited

U.S. PATENT DOCUMENTS

| | | | |
|---|---|---|---|
| 6,583,896 B1 * | 6/2003 | Suzuki et al. | 358/487 |
| 6,603,878 B1 * | 8/2003 | Takemoto | 382/167 |
| 6,643,406 B1 * | 11/2003 | Hajjahmad et al. | 382/240 |
| 6,757,081 B1 | 6/2004 | Fan et al. | |
| 7,260,269 B2 * | 8/2007 | Guleryuz | 382/274 |
| 7,436,557 B2 | 10/2008 | Suzuki | |
| 7,929,185 B2 * | 4/2011 | Liu | 358/474 |
| 7,936,468 B2 * | 5/2011 | Ferlitsch | 358/1.15 |

(Continued)

FOREIGN PATENT DOCUMENTS

| | | |
|---|---|---|
| EP | 1178437 A2 | 3/1995 |
| EP | 1463285 A2 | 3/2004 |

(Continued)

OTHER PUBLICATIONS

EP Office Action dtd Jan. 1, 2010, EP Appln. 08251176.7.

(Continued)

*Primary Examiner* — Akwasi M Sarpong
(74) *Attorney, Agent, or Firm* — Banner & Witcoff, Ltd.

(57) ABSTRACT

An image forming device may be provided with a setting data storage device, a preview image creation device, and an output device. The setting data storage device may be capable of storing a plurality of patterns of setting data. The preview image creation device may create, for each pattern of setting data stored in the setting data storage device, a preview image to which the pattern of setting data is reflected. The output device may output the plurality of preview images created by the preview image creation device.

20 Claims, 11 Drawing Sheets

(56) References Cited

U.S. PATENT DOCUMENTS

| | | | |
|---|---|---|---|
| 8,259,345 B2* | 9/2012 | Ogura | 358/1.9 |
| 2002/0026379 A1* | 2/2002 | Chiarabini et al. | 705/26 |
| 2002/0154343 A1* | 10/2002 | Chiu et al. | 358/474 |
| 2002/0196479 A1* | 12/2002 | Simske | 358/474 |
| 2003/0053183 A1* | 3/2003 | Huang et al. | 359/196 |
| 2005/0052701 A1* | 3/2005 | Suzuki | 358/2.1 |
| 2005/0219561 A1 | 10/2005 | Hankin | |
| 2006/0215197 A1 | 9/2006 | Tobioka | |
| 2011/0035503 A1* | 2/2011 | Zaid et al. | 709/228 |

FOREIGN PATENT DOCUMENTS

| | | | |
|---|---|---|---|
| EP | 1633131 A2 | 8/2005 | |
| EP | 1763215 A2 | 8/2006 | |
| JP | 11055444 A | 2/1999 | |
| JP | 2011055444 A | 2/1999 | |
| JP | 200145239 | 2/2001 | |
| JP | 2005072883 A | 3/2005 | |

OTHER PUBLICATIONS

CN Office Action dtd Aug. 3, 2010, CN Appln. 200810090748.X, English translation.
JP Office Action dtd Feb. 22, 2011, JP Appln. 2007-091334, English translation.
"Epson Scanner Instruction", Internet article <www.epson.jp/support/manual/data/scanner/gt9800f/NPD0035_V100W.pdf> 210 pages.
"Fuji Xerox Docucentre", Internet article <http://fujixerox.co.jp/product/dc_750/scan/html>, 4 pages accessed Jan. 17, 2007.
European Search Report, with written opinion, issued in European Patent Application No. EP 08251176.7-2202 dated Aug. 27, 2008.

* cited by examiner

FIG. 7

| | Operation on PC | Command |
|---|---|---|
| (1) | Double Click→<br>Object206(See FIG.3) | PROPFIND Including "/scanner" |
| (2) | Double Click→<br>Object92a(See FIG.3) | GET Including<br>"/scanner/settings.html" |
| (3) | Click→<br>OK Button180(See FIG.4) | Post Including<br>"/scanner/settings.html" |
| (4) | Copy→Object102a,112a,122a,etc<br>(See FIG.5) to Another Area | GET Including "/scanner/file name"<br>and Address of Copy Destination |

IMAGE FORMING DEVICE CREATING A PREVIEW IMAGE

CROSS-REFERENCE TO RELATED APPLICATION

This application is a continuation of U.S. patent application Ser. No. 12/078,248, filed on Mar. 28, 2008, which claims priority to Japanese Patent Application No. 2007-091334, filed on Mar. 30, 2007, the contents of which are each hereby incorporated by reference into the present application.

BACKGROUND OF THE INVENTION

1. Field of the Invention

The present invention relates to a technique for creating a preview image and providing it to a user. One technique taught by the present specification is a scanner that creates a preview image by executing a pre-scan upon a document.

2. Description of the Related Art

Scanners are known that, prior to executing a precise scan upon a document, execute a pre-scan upon the document and display a preview image. For example, this type of scanner is taught in Japanese Patent Application No. 2001-45239. By looking at the preview image prior to executing the precise scan, the user can ascertain in advance what type of scan data will be created by the precise scan. For example, the user can learn from the preview image that the document has been set obliquely, and can set the document straight prior to executing the precise scan.

The user can input scan setting data to the scanner for executing the precise scan. The scan setting data has a plurality of types of setting items. For example, the following setting items may be present: color for executing the precise scan (color, black and white, gray, etc.), and data format (JPEG, PDF, etc.). Further, the following setting item may for example be present: resolution for executing the precise scan. The pre-scan is normally executed with a lower resolution than the resolution of the scan setting data because displaying a comparatively low resolution preview image is sufficient for ascertaining the type of scan data in advance. After looking at the preview image, the user can input an operation to the scanner for executing the precise scan. The scanner thus executes the precise scan in accordance with the scan setting data that it is storing.

BRIEF SUMMARY OF THE INVENTION

The scanner of the above document is capable of storing only one pattern of scan setting data. In this case, when the scan setting data is to be changed from the previous time scanning was executed, and scanning is then to be executed, the user must re-input each setting item of the scan setting data to the scanner. The present inventor is thinking of realizing a scanner capable of storing a plurality of patterns of scan setting data so that the scan setting data does not have to be input each time scanning is executed. By realizing this configuration, the user can select one pattern out of the plurality of patterns of scan setting data stored in the scanner, and does not have to input the scan setting data each time scanning is executed. However, in the case where a method is to be adopted for the user to select the scan setting data out of the plurality of patterns of scan setting data stored in the scanner, it is preferable to provide the contents of each pattern of scan setting data to the user.

A technique is taught in the present specification for providing the user with the contents of each of the plurality of patterns of setting data. The present inventor discovered that it is possible to provide the user with the contents of the patterns of setting data by utilizing a preview image. The technique taught in the present specification has been created based on this concept, and has the following configuration. The technique taught in the present specification may be expressed as an image forming device. The technique taught in the present specification may also be expressed as a computer readable medium for a computer. In this case, the computer may be a computer mounted on an image forming device, and may also be a computer to be connected with an image forming device in a communicable manner.

The technique taught in the present specification is capable of being expressed as an image forming device for forming an image in accordance with setting data. The image forming device may comprise a setting data storage device, a preview image creation device, and an output device. The setting data storage device may be capable of storing a plurality of patterns of setting data. The preview image creation device may create, for each pattern of setting data stored in the setting data storage device, a preview image to which the pattern of setting data is reflected. The output device may output the plurality of preview images created by the preview image creation device. The image forming device may for example be a scanner. In this case, the setting data storage device may store a plurality of patterns of scan setting data. The preview image creation device may create, for each pattern of scan setting data stored in the setting data storage device, a preview image to which the pattern of scan setting data is reflected. Alternatively, the image forming device may for example be a printer. In this case, the setting data storage device may store a plurality of patterns of print setting data. The preview image creation device may create, for each pattern of print setting data stored in the setting data storage device, a preview image to which the pattern of print setting data is reflected. With this technique, the contents of the plurality of patterns of setting data stored in the image forming device can be provided to the user.

Furthermore, there is no particular restriction on the type of setting item that constitutes the setting data. For example, in the case of a scanner, the "scan setting data" may be constituted by any or a plurality of setting items such as resolution, data format of the scan data (JPEG, PDF, TIFF, etc.), and a setting item relating to color (color, black and white, gray, etc.). Moreover, the setting data storage device need not be housed in a main body of the image forming device. That is, an information processing device configured separately from the main body of the image forming device may comprise the setting data storage device. In this case, the image forming device taught in the present specification is realized by the main body of the image forming device and the information processing device.

The term "preview image to which the pattern of setting data is reflected" means a preview image to which at least one setting item of the setting data is reflected. For example, in the case where two setting items (for example, resolution and data format) are present in the setting data, the preview image may have only the resolution reflected thereto, may have only the data format reflected thereto, or may have both reflected thereto.

Further, the term "output" should be interpreted in its broadest sense, and includes displaying on a display device, printing, sending preview image data to another device, etc.

BRIEF DESCRIPTION OF THE DRAWINGS

FIG. 7 shows a table of correspondences between operations performed on a PC and commands.

DETAILED DESCRIPTION OF THE PREFERRED EMBODIMENT (Embodiments)

Figure 1:
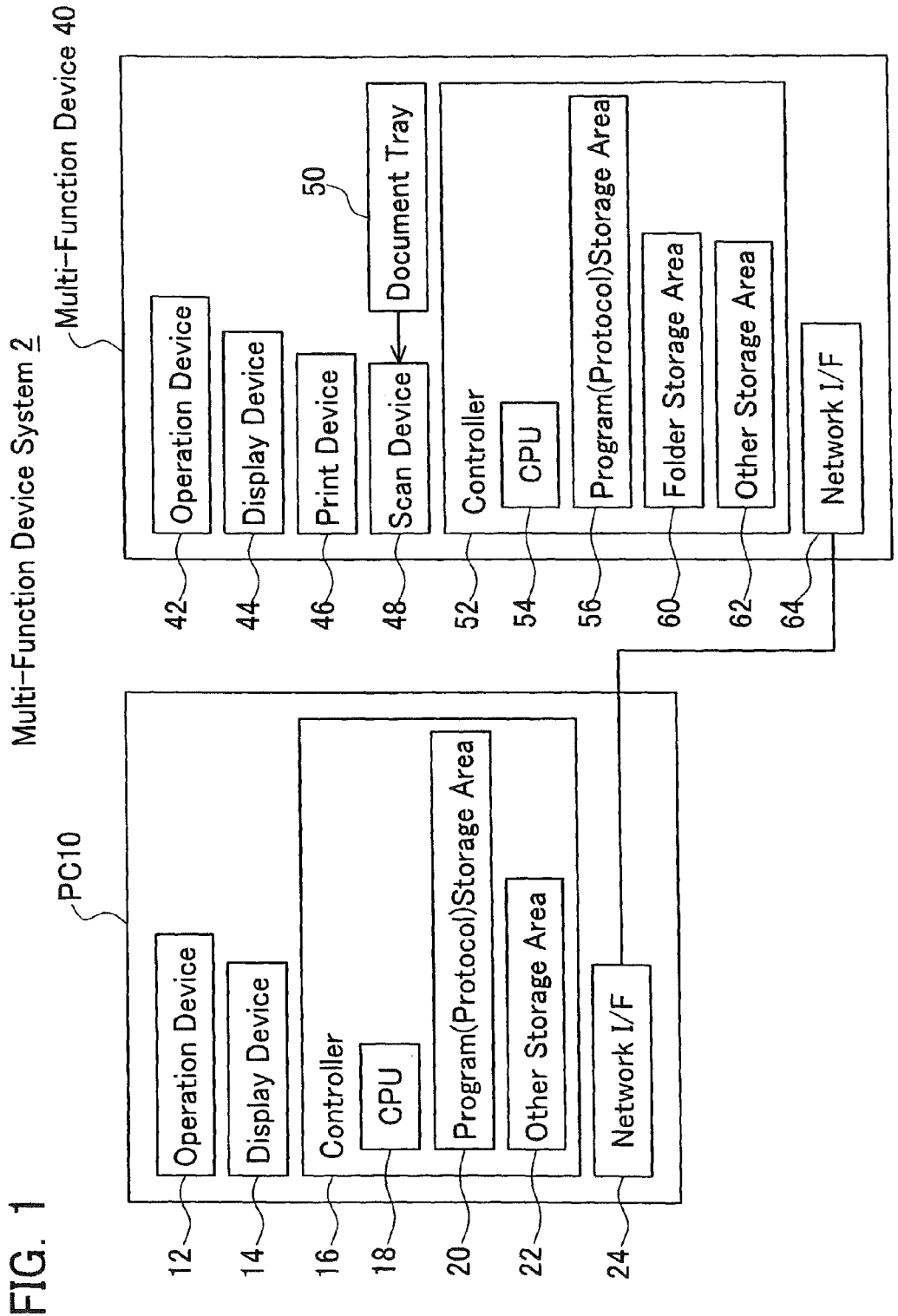
FIG. 1 shows a schematic view of a multi-function device system.

The present embodiment will be described with reference to figures. FIG. 1 shows the configuration of a multi-function device system 2 of the present embodiment. The multi-function device system 2 comprises a personal computer (termed PC below) 10, a multi-function device 40, etc. The configuration of the PC 10 and the multi-function device 40 will each be described in sequence below.

(Configuration of PC)

The PC 10 comprises an operation device 12, a display device 14, a controller 16, a network interface 24, etc. The operation device 12 consists of a keyboard and a mouse. The display device 14 consists of a liquid crystal display. The controller 16 comprises a CPU 18, a program storage area 20, and another storage area 22. The CPU 18 executes processes in accordance with various programs stored in the program storage area 20. The program storage area 20 stores various programs. An OS of the PC 10 of the present embodiment is described below using Windows (registered trademark) of the Microsoft corporation as an example. Windows (registered trademark) supports the WebDAV protocol. As a result, a program for executing a communication process utilizing the WebDAV protocol is stored in the program storage area 20. Moreover, although Windows (registered trademark), which is widely-known as an OS for PCs, is being utilized in the present embodiment, another type of OS may be utilized. In this case, a file sharing protocol other than the WebDAV protocol may be utilized. The other storage area 22 is capable of storing various data created during the processes executed by the CPU 18. The network interface 24 is connected to the multi-function device 40. The PC 10 is capable of communicating with the multi-function device 40 via the network interface 24. The PC 10 is capable of communicating with the multi-function device 40 utilizing the WebDAV protocol. Moreover, the PC 10 and the multi-function device 40 may be connected by the internet, or may be connected by a local area network.

(Configuration of Multi-Function Device)

The multi-function device 40 comprises an operation device 42, a display device 44, a print device 46, a scan device 48, a document tray 50, a controller 52, a network interface 64, etc. The operation device 42 has a plurality of keys. The display device 44 is capable of displaying information. The print device 46 is capable of printing on paper in accordance with print data. The print data may be sent from the exterior. Further, the print device 46 is capable of printing on paper in accordance with scan data created by the scan device 48 (to be described). That is, the multi-function device 40 is capable of realizing a copy function. The scan device 48 scans a document mounted in the document tray 50, and creates scan data. The controller 52 comprises a CPU 54, a program storage area 56, a folder storage area 60, and another storage area 62, etc. The CPU 54 executes processes in accordance with various programs stored in the program storage area 56. The program storage area 56 stores various programs. A program for executing a communication process utilizing the WebDAV protocol is stored in the program storage area 56.

Figure 2:
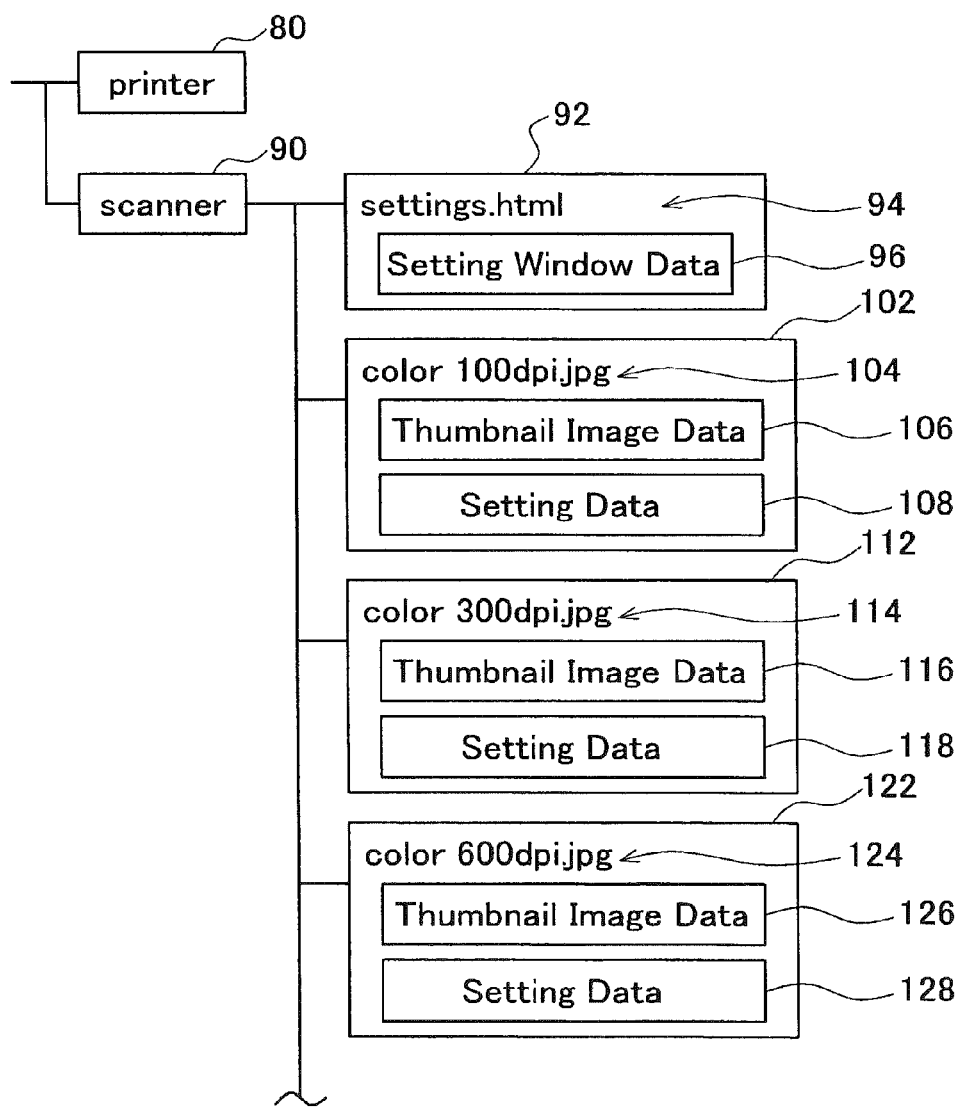
FIG. 2 shows an example of stored contents of a folder storage area.

The folder storage area 60 stores data. The PC 10 is capable of accessing the stored contents of the folder storage area 60. FIG. 2 shows an example of the stored contents of the folder storage area 60. The folder storage area 60 stores a plurality of folders (and files) that have a hierarchical structure. Top folders stored in the folder storage area 60 are a folder 80 and a folder 90. The folder 80 has a folder address (folder name) "printer". The folder 90 has a folder address (folder name) "scanner".

Files 92, 102, 112, 122, etc. exist as subordinate files of the folder 90. The setting window file 92 is an association of a file address (file name) 94 "settings.html" and setting window data 96. The specific contents of the setting window data 96 will be described later. As described above, the setting window file 92 is a subordinate file of the folder 90. As a result, the actual file address 94 has the folder address "scanner" of the folder 90 as its superior address. That is, the actual file address 94 is "scanner/settings.html". However, in the present embodiment, the file address 94 may simply be described as "settings.html". Below, as well, folder addresses and file addresses may be described in a format in which the superior address is omitted.

The thumbnail image files 102, 112, and 122 have a data configuration differing from that of the setting window file 92. The thumbnail image file 102 is an association of a file address 104 "color 100dpi.jpg", thumbnail image data 106, and scan setting data 108. The specific contents of the thumbnail image data 106 and the scan setting data 108 will be described later. The thumbnail image file 112 is an association of a file address 114 "color 300dpi.jpg", thumbnail image data 116, and scan setting data 118. The thumbnail image file 122 is an association of a file address 124 "color 600dpi.jpg", thumbnail image data 126, and scan setting data 128.

The storage area 62 shown in FIG. 1 is capable of storing data created while processes are executed by the CPU 54. The contents of the data stored in the storage area 62 will be described below as this becomes necessary. The network interface 64 is connected to the PC 10. The multi-function device 40 is capable of communicating with the PC 10 via the network interface 64. The multi-function device 40 is capable of communicating with the PC 10 utilizing the WebDAV protocol.

(User Operations and Data Displayed by PC)

Figure 3:
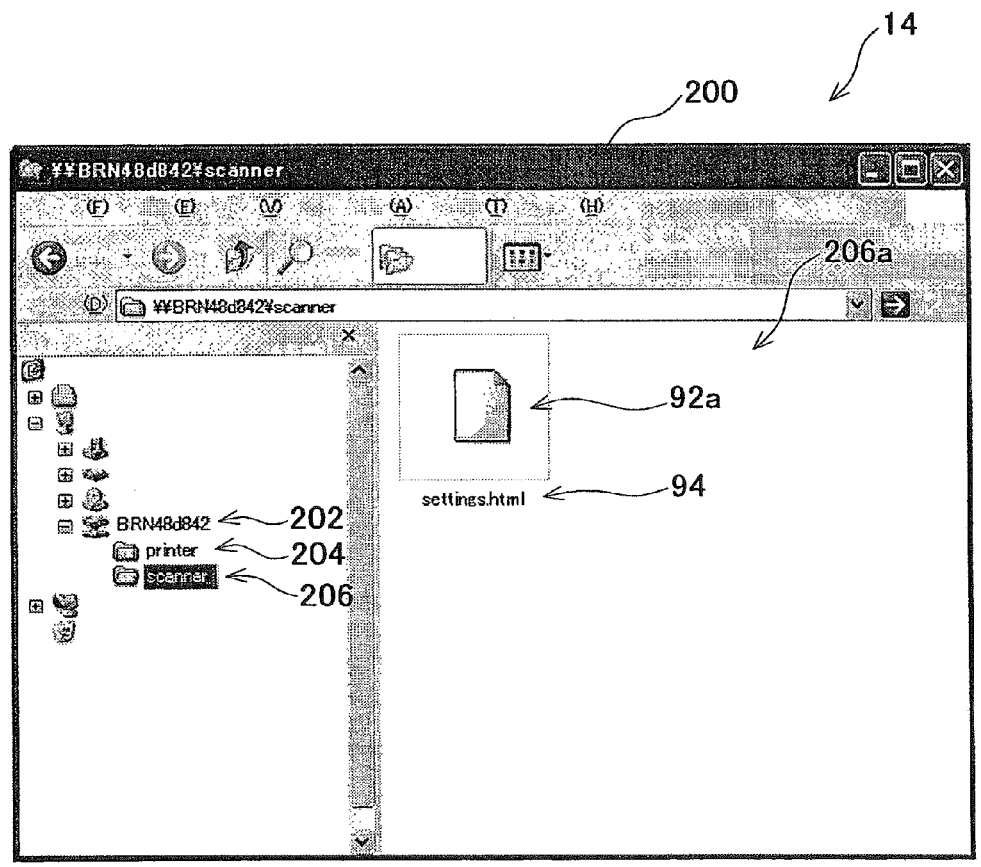
FIG. 3 shows a subordinate file of a "scanner" folder.

Next, operations that the user can execute on the PC 10 and data displayed by the PC 10 will be described. Moreover, objects (described below) are displayed on the PC 10 by communicating various commands and responses between the PC 10 and the multi-function device 40. Below, the contents of data displayed on the PC 10 will be described first, and then the commands and responses will be described. FIG. 3 shows an example of a window 200 displayed by the display device 14 of the PC 10. Moreover, FIG. 3 is based on Explorer (file management software) included in Windows (registered trademark) of the Microsoft corporation. A device object 202 displayed in the window 200 corresponds to the multi-function device 40. The PC 10 is capable of searching for devices present on the network that are connected to this PC 10. As a result, the PC 10 can know that the multi-function device 40 is present, and can display the device object 202.

The user can operate the mouse of the operation device 12 (see FIG. 1) to double click on the device object 202. Folder objects 204 and 206 are thus displayed in the window 200. The folder objects 204 and 206 correspond to the top folders stored in the folder storage area 60 (see FIG. 2) of the multi-function device 40. That is, the folder object 204 corresponds to the folder 80, and the folder object 206 corresponds to the folder 90. The user can double click on the folder object 206. As a result, a file object 92a is displayed in a display area 206a that refers to the contents of the folder object 206. The file object 92a corresponds to the setting window file 92 (see FIG. 2). The file object 92a has the address (file name) 94 "settings.html".

Figure 4:
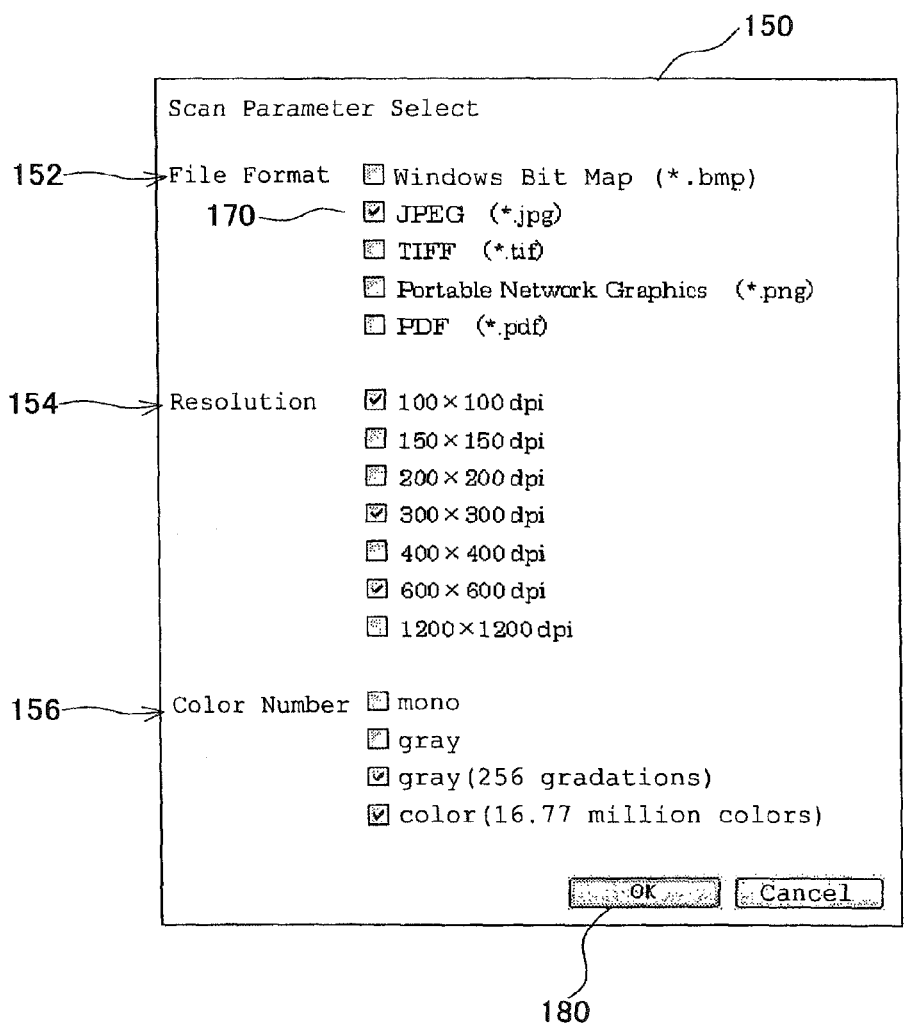
FIG. 4 shows an example of a scan setting window.

The user can double click on the file object 92a, whereby a scan setting window 150 shown in FIG. 4 is displayed. The scan setting window 150 comprises a plurality of setting items (file format 152, resolution 154, and color number 156).

The file format 152 is a setting item for designating the data format of the scan data (bitmap, JPEG, etc.). The user can designate the desired data format. By operating the mouse of the operation device 12 (see FIG. 1), the user can click on a check box 170 that corresponds to the desired data format. In this case, a check is displayed in the check box 170. The data format is thus designated. Further, the user can delete the check (designation) by clicking on the check that is being displayed in the check box 170. Although only one data format (JPEG) of the file format 152 is designated in the example of FIG. 4, the user can designate a plurality of data formats. The resolution 154 is a setting item for designating the scanning resolution. The user can designate the desired scanning resolution (one scanning resolution or a plurality of scanning resolutions). The color number 156 is a setting item for designating the color of the scan data. The user can designate the desired color (or plurality of colors) from among black and white, gray, color, etc.

The scan setting window 150 comprises an OK button 180. The user can operate the mouse of the operation device 12 (see FIG. 1) to click on the OK button 180. Data representing the contents designated by the user are thus sent to the multi-function device 40. The scan setting data is thus stored in the multi-function device 40. A plurality of patterns of scan setting data has been designated by the user in the example of FIG. 4. That is, one selection has been made for the file format 152, three selections have been made for the resolution 154, and two selections have been made for the color number 156. As a result, six patterns of scan setting data (1×3×2) have been designated by the user. Consequently, the multi-function device 40 stores six patterns of scan setting data. The plurality of patterns of scan setting data are stored as the setting window data 96 (shown in FIG. 2) in the folder storage area 60. Further, the thumbnail image files 102, 112, 114, etc. shown in FIG. 2 correspond to one pattern of scan setting data. As a result, in the case where there are six patterns of scan setting data, six thumbnail image files 102, 112, 114, etc. are created. This point will be described in detail below.

Figure 5:
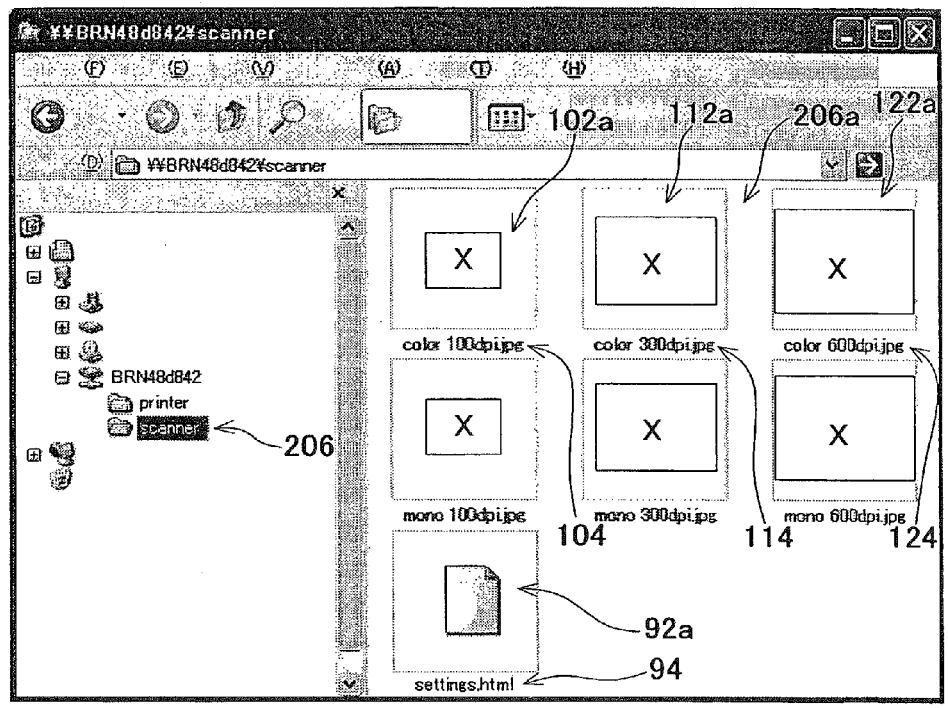
FIG. 5 shows a subordinate file of a "scanner" folder.

After designating the scan setting data in the scan setting window 150, the user can double click on the folder object 206 (see FIG. 3). In this case, as shown in FIG. 5, file objects 102a, 112a, 122a, etc. that refer to subordinate files of the folder object 206 are displayed. Moreover, like FIG. 3, FIG. 5 is based on Explorer (file management software) included in Windows (registered trademark) of the Microsoft corporation. The file object 102a corresponds to the thumbnail image file 102 (see FIG. 2). The file object 102a has the file address 104 "color 100dpi.jpg". The displayed contents of the file object 102a depend on the contents of the thumbnail image data 106. Although this will be described in detail later, the thumbnail image data 106 of the thumbnail image file 102 depends on the contents of the scan setting data 108 of the file 102. As a result, the displayed contents of the file object 102a reflect the contents of the scan setting data 108.

The file object 112a corresponds to the thumbnail image file 112. The displayed contents of the file object 112a reflect the contents of the scan setting data 118. Further, the file object 122a corresponds to the thumbnail image file 122. The displayed contents of the file object 122a reflect the contents of the scan setting data 128. Moreover, thumbnail image files corresponding to other file objects that are not numbered in FIG. 5 (for example, "mono 100dpi.jpg", etc.) have been omitted in FIG. 2.

After designating the scan setting data in the scan setting window 150, the user can again double click on the file object 92a (see FIG. 5). In this case, the scan setting window 150 (see FIG. 4) is displayed that is reflecting the scan setting data that was input earlier. For example, in the case where the check box 170 corresponding to JPEG was checked earlier, the scan setting window 150 is displayed in the format that was checked in the check box 170. The user can change the scan setting data in the scan setting window 150. That is, the check in the check box 170 can be deleted, and another check box can be checked. After changing the scan setting data, the user can update the setting window data 96 (see FIG. 2) by clicking on the OK button 180.

Figure 6:
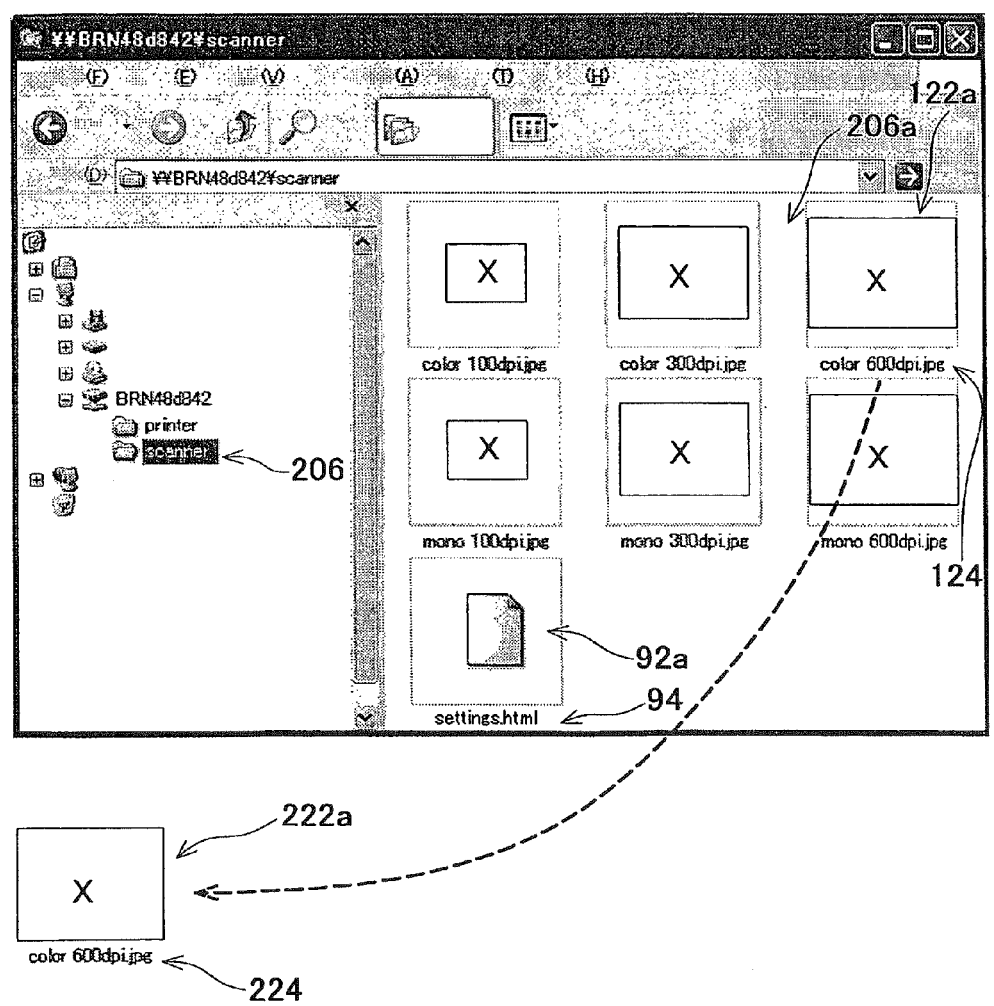
FIG. 6 shows how a "color 600 dpi" file is copied to another location.

In the case where scanning is to be executed, the user executes the following operations. First, the user sets a document of a scanning subject in the document tray 50 (see FIG. 1). Next, the user determines the desired scan setting data while looking at the display shown in FIG. 5. As described above, the displayed contents of the file objects 102a, 112a, 122a, etc. are a reflection of the patterns of scan setting data 108, 118, 128, etc. The user can determine the desired scan setting data while looking at the file objects 102a, 112a, 122a, etc. For example, in the case where scanning will be executed utilizing "color 600dpi", the user can copy the file object 122a to any location outside the display area 206a (for example, to the desktop). FIG. 6 shows how this is performed. Moreover, like FIG. 3, etc., FIG. 6 is based on Explorer (file management software) included in Windows (registered trademark) of the Microsoft corporation. When the user has performed the copy operation, the multi-function device 40 executes a precise scan of the document set in the document tray 50, and creates scan data. The PC 10 is capable of displaying a scan file object 222a that corresponds to the scan data at a copy destination. The displayed contents of the scan file object 222a depend on the scan data. The scan file object 222a has an address 224 that is identical with an address 124 of the file object 122a.

(Commands sent from PC)

The data displayed in the PC 10 when the user executes operations has been described in detail. Next, the commands sent from the PC 10 to the multi-function device 40 will be described in detail. As described above, the PC 10 and the multi-function device 40 are capable of communicating utilizing the WebDAV protocol. Various types of commands are utilized in the WebDAV protocol. Below, some commands relating to the present embodiment will be described. Moreover, the "POST command" below is not a communication command of the WebDAV protocol, but is an HTTP communication command. The other commands are communication commands of the WebDAV protocol.

FIG. 7 shows operations that the user has performed on the PC 10, and commands that are sent from the PC 10 to the multi-function device 40 in accordance with those operations.

(1) In the case where the folder object 206 shown in FIG. 3 is double clicked on, a PROPFIND command including the address "scanner" is sent to the multi-function device 40.

(2) In the case where the file object 92*a* shown in FIG. 3 is double clicked on, a GET command including the address "scanner/settings.html" is sent to the multi-function device 40.

(3) In the case where the OK button 180 (see FIG. 4) of the scan setting window 150 is clicked on, a POST command including the address "scanner/settings.html" is sent to the multi-function device 40.

(4) In the case where any of the file objects 102*a*, 112*a*, 122*a*, etc. shown in FIG. 5 has been copied from the display area 206*a* to another location, a GET command including the address "scanner/file name" and the address of the copy destination is sent to the multi-function device 40. For example, in the example of FIG. 6, a GET command including the address "scanner/color 600dpi.jpg" is sent to the multi-function device 40.

(Processes Executed by Multi-Function Device)

Next, the contents of processes executed by the multi-function device 40 will be described in detail. The processes below are executed by the CPU 54 (see FIG. 1) of the multi-function device 40.

(Main Process)

Figure 8:
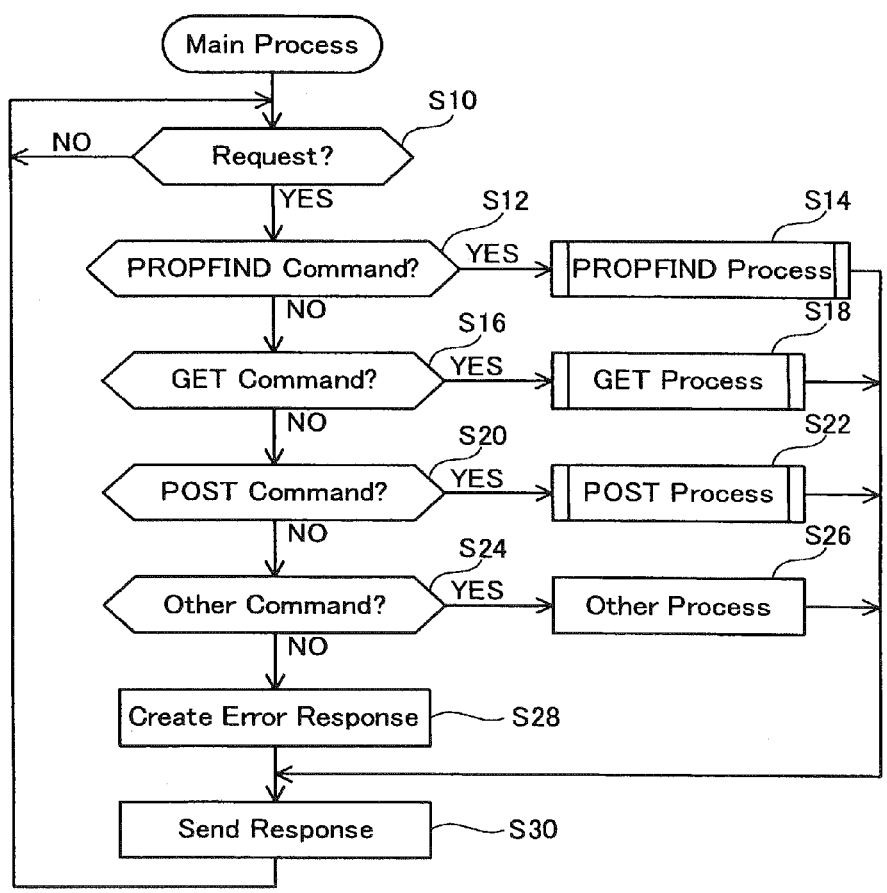
FIG. 8 shows a flow chart of a main process of the multi-function device.

FIG. 8 shows a flow chart of a main process. The CPU 54 monitors whether a request (command) has been made from the PC 10 (S10). In the case of YES in S10, the process proceeds to S12. In S12, the CPU 54 determines whether the request from the PC 10 is the PROPFIND command. In the case of YES in S12, the CPU 54 executes a PROPFIND process (S14). In the case of NO in S12, the CPU 54 determines whether the request from the PC 10 is the GET command (S16). In the case of YES in S16, the CPU 54 executes a GET process (S18). In the case of NO in S16, the CPU 54 determines whether the request from the PC 10 is the POST command (S20). In the case of YES in S20, the CPU 54 executes a POST process (S22).

In the case of NO in S20, the CPU 54 determines whether the request from the PC 10 is another command (S24). In the case of YES in S24, the CPU 54 executes a process in accordance with the command (S26). In the case of NO in S24, the CPU 54 creates an error response (S28). In this case, the CPU 54 executes a process to send the error response to the PC 10 (S30). Moreover, in the case where S14, S18, S22, and S26 have been executed, the CPU 54 sends a response in S30 that has been created in each of the respective processes.

(PROPFIND Process)

Figure 9:
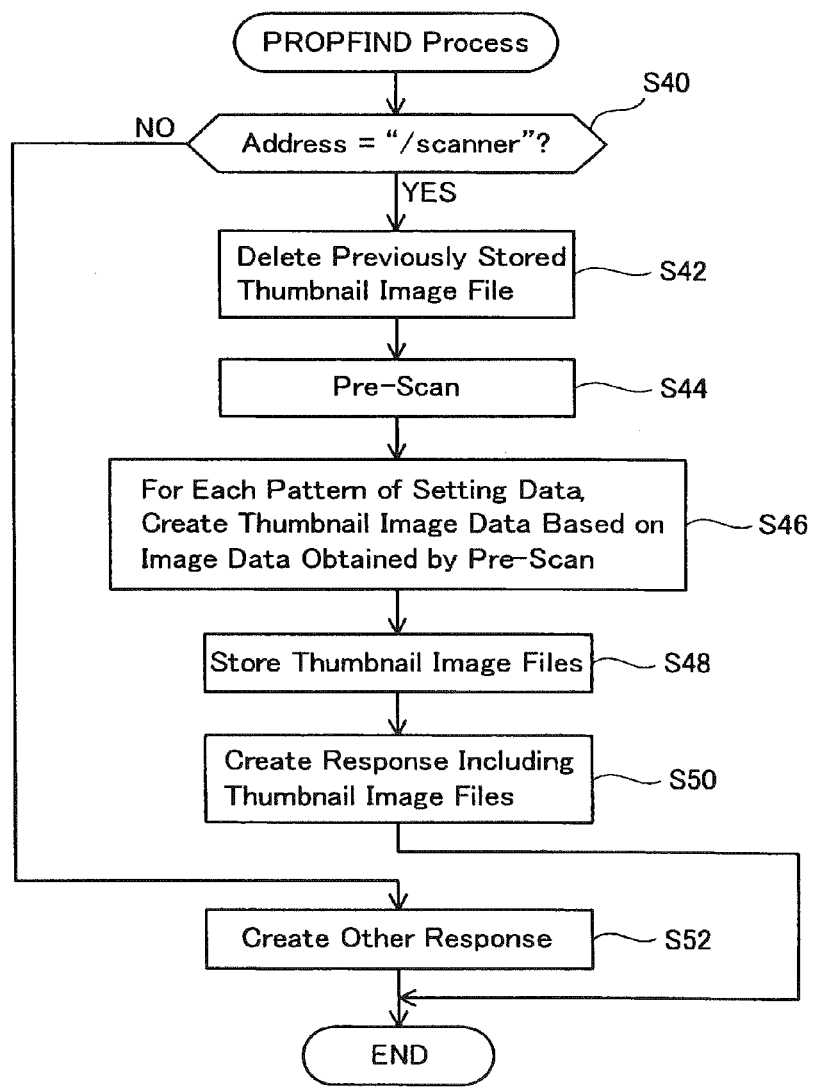
FIG. 9 shows a flow chart of a PROPFIND process.

The PROPFIND process of S14 of FIG. 8 will now be described. FIG. 9 shows a flow chart of the PROPFIND process. The CPU 54 determines whether the address included in the PROPFIND command is "scanner" (S40). That is, it is determined whether a PROPFIND command corresponding to (1) of FIG. 7 has been received. In the case of NO in S40, the CPU 54 creates another type of response that corresponds to the PROPFIND command (S52). In the case of YES in S40, the CPU 54 deletes, from the folder storage area 60, the thumbnail image files 102, 112, 122, etc. (see FIG. 2) that have the folder address "scanner" of the folder 90 (see FIG. 2) as the superior address (S42).

Next, the CPU 54 causes the scan device 48 (see FIG. 1) to execute a pre-scan (S44). The scan device 48 thus pre-scans document mounted in the document tray 50 (see FIG. 1). This pre-scan is a color scan. Further, the pre-scan is executed utilizing a resolution that has been determined in advance (100 dpi, for example). As shown in FIG. 5, etc., the file objects 102*a*, 112*a*, 122*a*, etc. have differing image sizes.

Although this will be described in detail later, the image size depends on the resolution of the scan setting data 108, 118, 128, etc. In the present embodiment, the highest resolution is 1200 dpi (see FIG. 4). As a result, the file object that corresponds to the 1200 dpi scan setting data has the largest image size. The resolution of the pre-scan is set to a size capable of creating this largest image size (and is set to the lowest possible value). Consequently, it is possible to create thumbnail image data of all sizes by reducing the image data obtained by means of the pre-scan (below, this may be termed "pre-scan data"). The pre-scan data obtained by means of the pre-scan is stored temporarily in the storage area 62 (see FIG. 1).

Next, the CPU 54 creates thumbnail image data from the pre-scan data (S46). As described above, the plurality of patterns of scan setting data designated by the user in the scan setting window 150 is stored in the setting window data 96 (see FIG. 2). The CPU 54 obtains the plurality of patterns of scan setting data by reading the setting window data 96. The CPU 54 creates thumbnail image data that corresponds to each of the plurality of patterns of scan setting data. For example, in the case where there are two patterns of scan setting data, namely color 100 dpi, and black and white 300 dpi, small size color thumbnail image data and large size black and white thumbnail image data are created. The greater the resolution 154 (see FIG. 4) of the scan setting data, the greater the vertical and horizontal size of the thumbnail image data. In the present embodiment, the thumbnail image data that corresponds to 1200 dpi scan setting data is largest in size. Conversely, the thumbnail image data that corresponds to 100 dpi scan setting data is smallest in size. Further, the color number of the thumbnail image data corresponds to the color number 156 (see FIG. 4) of the scan setting data. Black and white thumbnail image data is created in the case of black and white scan setting data, gray thumbnail image data is created in the case of gray scan setting data, and color thumbnail image data is created in the case of color scan setting data. As described above, the pre-scan is executed by means of a color scan. As a result, color pre-scan data exists. The CPU 54 creates black and white or gray thumbnail image data by converting the color pre-scan data into black and white, or into gray.

As described above, there are six patterns of scan setting data in the example of FIG. 4. In the case of this example, six items of thumbnail image data are created in S46. That is, the following items of thumbnail image data are created: small size gray thumbnail image data, small size color thumbnail image data, medium size gray thumbnail image data, medium size color thumbnail image data, large size gray thumbnail image data, and large size color thumbnail image data. Moreover, the CPU 54 also creates thumbnail image data of the file format 152 designated by the user. In the case of the example of FIG. 4, the JPEG file format 152 was designated, and consequently JPEG format thumbnail image data is created. As a result, in the case where two or more file formats have been designated, thumbnail image data of two or more types of file format are created.

Next, the CPU 54 creates thumbnail image files that correspond to the thumbnail image data created in S46 (S48). For example, in the case of the example of FIG. 4, six items of thumbnail image data have been created. In this case, six thumbnail image files are created in S48. That is, the same number of thumbnail image files is created as the number of patterns of scan setting data. Below, the contents of S48 will be described in detail using as an example the creation of a thumbnail image file having the following pattern of scan setting data: file format 152 is JPEG, resolution 154 is 100 dpi, and color number 156 is color (below, this pattern of scan setting data is termed a "predetermined pattern of scan setting data").

First, the CPU 54 creates a file address. The file address includes a character string to which the scan setting data is reflected. For example, in the case of the predetermined pattern of scan setting data, the CPU 54 creates the file address "color 100dpi.jpg". Moreover, this file address has the folder address (see the folder 90 of FIG. 2) "scanner" as the superior address. That is, the actual file address is "scanner/color 100dpi.jpg". The CPU 54 stores an association of the created file address, the thumbnail image data created in S46, and the predetermined pattern of scan setting data (JPEG, 100 dpi, and color) in the folder storage area 60 (see FIGS. 1 and 2). The thumbnail image file is thus created.

The CPU 54 creates the thumbnail image files corresponding to the other patterns of scan setting data (the other thumbnail image data created in S46) in the same manner as in the above example. A plurality of thumbnail image files is thus stored in the folder storage area 60.

The CPU 54 creates a response (S50) including property information of the thumbnail image files created in S48. Specifically, the CPU 54 creates a response including the file address and the thumbnail image data of the thumbnail image files. For example, in the case of the example of FIG. 2, responses are created that include the file address 104 and the thumbnail image data 106, that include the file address 114 and the thumbnail image data 116, and that include the file address 124 and the thumbnail image data 126. Moreover, the file address 94 of the setting window file 92 is included in these responses.

The responses created in S50 are sent to the PC 10 (see S30 of FIG. 8). The PC 10 can thus recognize that the subordinate files 92, 102, 112, 122, etc. of the folder 90 are present. As a result, the PC 10 can display the file objects 92a, 102a, 112a, 122a, etc. (see FIG. 5). The displayed contents of the file objects 102a, 112a, 122a, etc. depend on the thumbnail image data 106, 116, 126, etc. That is, file objects (for example, 122a) that correspond to high resolution scan setting data have a large image size (a pre-scan image), and file objects (for example, 102a) that correspond to low resolution scan setting data have a small image size. Further, file objects (for example, 102a) that correspond to color scan setting data have a color image, and file objects (number omitted) that correspond to black and white scan setting data have a black and white image.

(GET Process)

Figure 10:
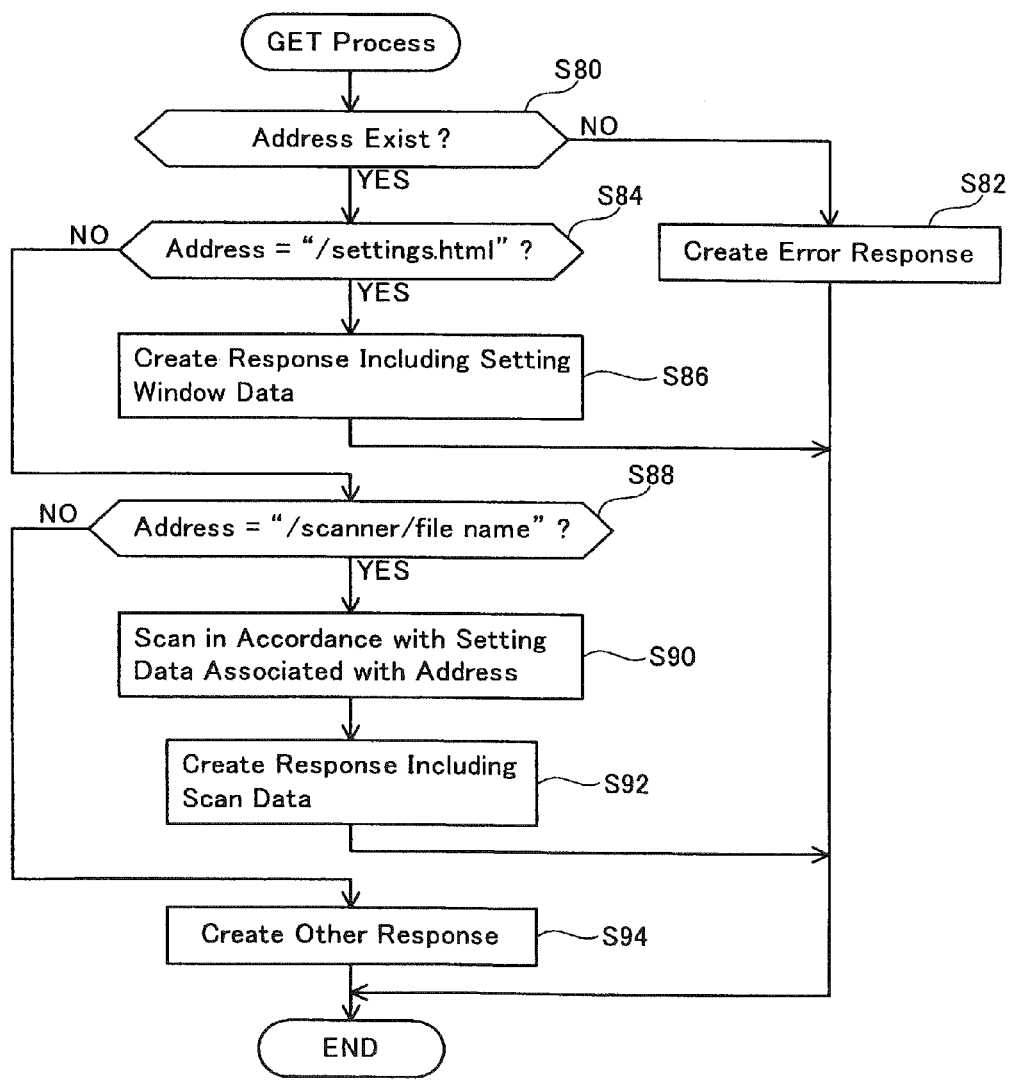
FIG. 10 shows a flow chart of a GET process.

The GET process of S18 of FIG. 8 will now be described. FIG. 10 shows a flow chart of the GET process. The CPU 54 determines (S80) whether an address included in the GET command exists in the folder storage area 60 (see FIG. 1). In the case of NO in S80, the CPU 54 creates an error response (S82). In the case of YES in S80, the CPU 54 determines whether the address included in the GET command is "settings.html" (S84). That is, it is determined whether a GET command corresponding to (2) of FIG. 7 has been received. In the case of YES in S84, the CPU 54 creates a response (S86) that includes the setting window data 96. This response is sent to the PC 10 (see S30 of FIG. 8). As a result, the PC 10 can display the scan setting window 150 (see FIG. 4).

In the case of NO in S84, the CPU 54 determines whether the address included in the GET command is "scanner/file name" (S88). That is, it is determined whether a GET command corresponding to (4) of FIG. 7 has been received. In the case of NO in S88, the CPU 54 creates another type of response that corresponds to the GET command (S94). In the case of YES in S88, the CPU 54 executes precise scanning (S90) in accordance with the scan setting data associated with the file address included in the GET command. For example, in the case where the address included in the GET command is "scanner/color 600dpi.jpg", the CPU 54 executes precise scanning in accordance with the scan setting data 128 (see FIG. 2). That is, the CPU 54 orders the scan device 48 (see FIG. 1) to execute scanning based on the scan setting data 128. In this case, the scan device 48 executes a 600 dpi color scan of the document mounted in the document tray 50 (see FIG. 1), and creates JPEG format scan data.

Next, the CPU 54 creates a response that includes the scan data created in S90 (S92). This response is sent to the PC 10 (see S30 of FIG. 8). As a result, the PC 10 can obtain the scan data, and can display the scan file object 222a (see FIG. 6). Although a detailed illustration is omitted, the user can display the scan data by double clicking on the scan file object 222a.

(POST Process)

Figure 11:
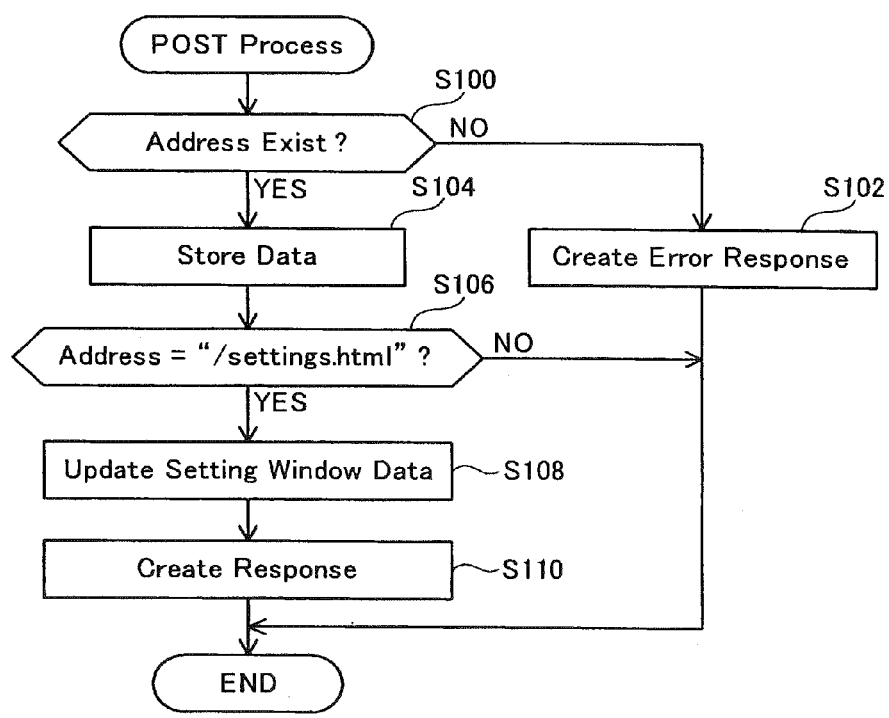
FIG. 11 shows a flow chart of a POST process.

The POST process of S22 of FIG. 8 will now be described. FIG. 11 shows a flow chart of the POST process. The CPU 54 determines (S100) whether an address included in the POST command exists in the folder storage area 60 (see FIG. 1). In the case of NO in S100, the CPU 54 creates an error response (S102). In the case of YES in S100, the CPU 54 temporarily stores the data received with the POST command (mainly setting data) in the storage area 62 (S104). Next, the CPU 54 determines whether the address included in the POST command is "settings.html" (S106). That is, it is determined whether a POST command corresponding to (3) of FIG. 7 has been received. In the case of YES in S106, the CPU 54 updates the setting window data 96 (see FIG. 2) of the setting window file 92 to the received scan setting data (the data stored temporarily in S104) (S108). The plurality of patterns of scan setting data designated by the user is thus stored as the setting window data 96 in the folder storage area 60. When S108 ends, the CPU 54 creates a response (S110) showing that the POST process has been executed.

The multi-function device system 2 of the present embodiment has been described in detail. The multi-function device 40 of the present embodiment can store a plurality of patterns of scan setting data 108, 118, 128, etc. (see FIG. 2). For each of the plurality of patterns of scan setting data that the multi-function device 40 is storing, the multi-function device 40 creates the thumbnail image data 106, 116, 126, etc. (see S46 of FIG. 9) to which the patterns of scan setting data are reflected. For example, color thumbnail image data is created in the case of color scan setting data, black and white thumbnail image data is created in the case of black and white scan setting data, and gray thumbnail image data is created in the case of gray scan setting data. Further, thumbnail image data is created in a size that corresponds to the resolution of the scan setting data. This thumbnail image data is sent to the PC 10. As a result, the PC 10 can display the file objects 102a, 112a, 122a, etc. that correspond respectively to the thumbnail image data. By looking at the file objects 102a, 112a, 122a, etc., the user can easily understand the contents of the plurality of patterns of scan setting data 108, 118, 128, etc. stored by the multi-function device 40. With the present embodiment, the contents of the plurality of patterns of scan setting data 108, 118, 128, etc. stored by the multi-function device 40 can be presented to the user in a format that is easily understood. The user can execute a precise scan in accordance with desired scan setting data by copying the file object (122a, for example) that corresponds to that scan setting data to a different location. The user can thus obtain scan data that was created by means of the precise scan.

Further, the multi-function device 40 creates the plurality of thumbnail image data 106, 116, 126, etc. by executing the pre-scan one time on the document. Since pre-scanning is not executed multiple times, it is possible to shorten the time needed to create the thumbnail image data 106, 116, 126, etc.

A part of technique disclosed in the abode embodiments is described below. An image forming device may be a scanner or may be a printer. In the case where the image forming device is a scanner, the preview image creation device may create, for each pattern of scan setting data stored in the setting data storage device, a preview image to which the pattern of scan setting data is reflected by executing a pre-scan upon a document. That is, the scanner may create preview images to which the patterns of scan setting data that the scanner is storing are reflected. These preview images are provided to a user. With this technique, the contents of the plurality of patterns of scan setting data stored in the scanner can be provided to the user.

A preview image creation device may create the plurality of preview images by executing a pre-scan corresponding to each of the plurality of patterns of scan setting data. For example, in the case where there is black and white scan setting data and color scan setting data, two pre-scans (a black and white pre-scan and a color pre-scan) may be executed. Alternatively, the preview image creation device may create the plurality of preview images by executing one pre-scan upon the document. Since it is not necessary to execute a plurality of pre-scans in this case, the time for creating the preview images can be decreased. For example, in the case where there is black and white scan setting data and color scan setting data, only the color pre-scan needs to be executed. In this case, a color preview image can be created from pre-scan data obtained by means of this pre-scan, and a black and white preview image can be created by converting the pre-scan data into black and white.

In the case where the image forming device is a scanner, the scanner may further comprise the following configuration. The scanner may further comprise a scan device that executes a precise scan upon the document in accordance with the pattern of scan setting data corresponding to the preview image selected from among the plurality of preview images output by an output device. The user can select any preview image to which the pattern of scan setting data is reflected from among the plurality of preview images output by the output device. "Selection" may be executed utilizing various methods. For example, in the case where a plurality of preview images is displayed by a display device of the scanner, the preview image may be selected by touching the display device (i.e. the display device is a touch panel). Further, the preview image may be selected by operating an operation device (for example, operation keys) of the scanner. Furthermore, in the case where a plurality of preview images is sent to another device, the preview image may be selected in that device. With this configuration, a precise scan can be executed in accordance with a pattern of scan setting data selected based on the plurality of preview images.

An information processing device and an image forming device may be communicably connected to construct a system. The image forming device may be capable of sending a plurality of preview images to the information processing device.

The information processing device and the image forming device may be capable of performing communication utilizing a file sharing protocol. For example, the information processing device and the image forming device may be capable of performing communication utilizing the WebDAV (Web Distributed Authoring and Versioning) file sharing protocol. The WebDAV protocol is a protocol supported by Windows (registered trademark) of the Microsoft corporation.

The image forming device may create a file having an association of a file address, setting data, and thumbnail image data (preview image data), and may store this file.

The image forming device may store a predetermined folder address. The file address of the aforementioned file may be created such that the predetermined folder address is its superior address.

In the case where a property obtaining command including the predetermined folder address has been received from the information processing device, the image forming device may send a thumbnail image of the file having the predetermined folder address as its superior address to the information processing device. In the case of the WebDAV protocol, the property obtaining command is a PROPFIND command.

The image forming device may be capable of receiving an obtaining command sent from the information processing device. In the case of the WebDAV protocol, the obtaining command is a GET command.

The image forming device may be capable of receiving a data storage instruction command sent from the information processing device. In the case of HTTP, the data storage instruction command is a POST command.

The image forming device may comprise a device for inputting information specifying a pattern selected by the user from among the plurality of patterns of scan setting data. The scanner may execute a precise scan in accordance with the pattern of scan setting data selected by the user.

The present embodiment has been described in detail above, however this is simply an illustration. The specific example illustrated above can be modified and changed in various ways. Examples of modifications to the present embodiment are given below.

(1) A file sharing protocol other than the WebDAV protocol may be utilized. For example, an SMB (Server Message Block) protocol may be utilized.

(2) An information processing device other than the PC 10 may be utilized. The information processing device may be any type of device as long as it is capable of communication utilizing a file sharing protocol and has at least a display device. For example, a portable telephone, a portable music reproduction device, a PDA, etc. may be utilized.

(3) The scan setting data 108, 118, 128, etc. may be input to the multi-function device 40 by operating the operation device 42 (see FIG. 1) of the multi-function device 40.

(4) The multi-function device 40 may display the thumbnail image data 106, 116, 126, etc. in its display device 44 (see FIG. 1). In this case, the multi-function device 40 may allow the user to select one item of thumbnail image data by operating the operation device 42, and may execute the precise scan in accordance with the scan setting data corresponding to the selected thumbnail image data.

(5) The above embodiment can also be applied to creating a preview image to which print setting data is reflected, and providing this to the user. In this case, the multi-function device 40 stores a plurality of patterns of print setting data (consisting of a plurality of setting items, such as for example paper size, paper orientation, etc.). The multi-function device 40 creates, for each of the plurality of patterns of print setting data, a preview image to which the print setting data is reflected. The multi-function device 40 sends the preview images to the PC 10. The user can select the desired preview image (print setting data) in the PC 10. The multi-function device 40 executes a printing process in accordance with the selected print setting data.

What is claimed is:

1. A scanner comprising:

a scan device;

a storage device configured to store a plurality of patterns of scan setting data, and a plurality of preview image files corresponding to the plurality of patterns of scan setting data; and a controller configured to execute:

causing the scan device to perform a pre-scan so as to obtain pre-scan data from the scan device;

creating, using the pre-scan data, the plurality of preview image files corresponding to the plurality of patterns of scan setting data stored in the storage device, wherein in each of the plurality of preview image files, a corresponding pattern of scan setting data among the plurality of scan setting data is reflected;

storing the created plurality of preview image files in the storage device in a manner in which the plurality of preview image files are viewable by an external device via a network;

receiving, from the external device via the network, an acquisition request for one preview image file which is selected from among the plurality of preview image files;

causing the scan device to start performing a precise scan when the acquisition request is received from the external device via the network, so as to create a precise scan image file in which a pattern of scan setting data corresponding to the one preview image file among the plurality of patterns of scan setting data is reflected; and sending the created precise scan image file to the external device via the network, wherein the plurality of patterns of scan setting data includes:

a first pattern of scan setting data including a first scan resolution; and a second pattern of scan setting data including a second scan resolution which is higher than the first scan resolution, and wherein the plurality of preview image files includes:

a first preview image file which reflects the first pattern of scan setting data and represents a first preview image; and a second preview image file which reflects the second pattern of scan setting data and represents a second preview image which has a larger vertical and horizontal size than the first preview image.

2. The scanner as in claim 1, wherein the controller is configured to receive the acquisition request from the external device using a file sharing protocol, and wherein the controller is configured to send the precise scan image file to the external device using the file sharing protocol.

3. The scanner as in claim 1, wherein the controller is configured to receive the acquisition request from the external device when a copy of the one preview image file from the scanner to the external device is instructed by a user of the external device.

4. The scanner as in claim 1, wherein the controller is configured to further execute:

receiving a view request for files in the storage device from the external device via the network, wherein the controller is configured to cause the scan device to start performing the pre-scan when the view request is received from the external device.

5. The scanner as in claim 1, wherein the controller is configured to cause the scan device to perform a single pre-scan so as to obtain the pre-scan data from the scan device.

6. A scanner, comprising:

a scan device;

a storage device configured to store a plurality of patterns of scan setting data, and a plurality of preview image files corresponding to the plurality of patterns of scan setting data; and a controller configured to execute:

causing the scan device to perform a pre-scan so as to obtain pre-scan data from the scan device;

creating, using the pre-scan data, the plurality of preview image files corresponding to the plurality of patterns of scan setting data stored in the storage device, wherein in each of the plurality of preview image files, a corresponding pattern of scan setting data among the plurality of scan setting data is reflected;

storing the created plurality of preview image files in the storage device in a manner in which the plurality of preview image files are viewable by an external device via a network;

receiving, from the external device via the network, an acquisition request for one preview image file which is selected from among the plurality of preview image files;

causing the scan device to start performing a precise scan when the acquisition request is received from the external device via the network, so as to create a precise scan image file in which a pattern of scan setting data corresponding to the one preview image file among the plurality of patterns of scan setting data is reflected; and sending the created precise scan image file to the external device via the network, wherein the plurality of patterns of scan setting data includes:

a first pattern of scan setting data indicating a monochrome; and a second pattern of scan setting data indicating a color, and wherein the plurality of preview image files includes:

a first preview image file which reflects the first pattern of scan setting data and represents a first preview image which is a monochrome image; and a second preview image file which reflects the second pattern of scan setting data and represents a second preview image which is a color image.

7. One or more non-transitory computer readable media storing computer-executable instructions that, when executed by one or more processors of an apparatus, cause the apparatus to:

perform a pre-scan so as to obtain pre-scan data from a scan device;

create, using the pre-scan data, a plurality of preview image files corresponding to a plurality of patterns of scan setting data, wherein in each of the plurality of preview image files, a corresponding pattern of scan setting data among the plurality of scan setting data is reflected;

store the created plurality of preview image files in a manner in which the plurality of preview image files are viewable by an external device via a network;

receive, from the external device via the network, an acquisition request for one preview image file which is selected from among the plurality of preview image files;

cause the scan device to start performing a precise scan when the acquisition request is received from the external device via the network, so as to create a precise scan image file in which a pattern of scan setting data corresponding to the one preview image file among the plurality of patterns of scan setting data is reflected; and send the created precise scan image file to the external device via the network, wherein the plurality of patterns of scan setting data includes:
- a first pattern of scan setting data including a first scan resolution; and
- a second pattern of scan setting data including a second scan resolution which is higher than the first scan resolution, and wherein the plurality of preview image files includes:
- a first preview image file which reflects the first pattern of scan setting data and represents a first preview image; and
- a second preview image file which reflects the second pattern of scan setting data and represents a second preview image which has a larger vertical and horizontal size than the first preview image.

8. The one or more non-transitory computer readable media of claim 7, wherein the computer-executable instructions cause the apparatus to:
- receive the acquisition request from the external device using a file sharing protocol; and
- send the precise scan image file to the external device using the file sharing protocol.

9. The one or more non-transitory computer readable media of claim 7, wherein the computer-executable instructions cause the apparatus to receive the acquisition request from the external device when a copy of the one preview image file from the apparatus to the external device is instructed by a user of the external device.

10. The one or more non-transitory computer readable media of claim 7, wherein the computer-executable instructions, when executed, further cause the apparatus to:
- receive a view request for files in a storage device of the apparatus from the external device via the network,
- wherein the computer-executable instructions cause the scan device to start performing the pre-scan when the view request is received from the external device.

11. The one or more non-transitory computer readable media of claim 7, wherein the computer-executable instructions cause the scan device to perform a single pre-scan so as to obtain the pre-scan data from the scan device.

12. One or more non-transitory computer readable media storing computer-executable instructions that, when executed by one or more processors of an apparatus, cause the apparatus to:
- perform a pre-scan so as to obtain pre-scan data from a scan device;
- create, using the pre-scan data, a plurality of preview image files corresponding to a plurality of patterns of scan setting data, wherein in each of the plurality of preview image files, a corresponding pattern of scan setting data among the plurality of scan setting data is reflected;
- store the created plurality of preview image files in a manner in which the plurality of preview image files are viewable by an external device via a network;
- receive, from the external device via the network, an acquisition request for one preview image file which is selected from among the plurality of preview image files;

cause the scan device to start performing a precise scan when the acquisition request is received from the external device via the network, so as to create a precise scan image file in which a pattern of scan setting data corresponding to the one preview image file among the plurality of patterns of scan setting data is reflected; and send the created precise scan image file to the external device via the network, wherein the plurality of patterns of scan setting data includes:
- a first pattern of scan setting data indicating a monochrome; and
- a second pattern of scan setting data indicating a color, and wherein the plurality of preview image files includes:
- a first preview image file which reflects the first pattern of scan setting data and represents a first preview image which is a monochrome image; and
- a second preview image file which reflects the second pattern of scan setting data and represents a second preview image which is a color image.

13. The scanner as in claim 1,
wherein the plurality of preview image files respectively correspond to the plurality of patterns of scan setting data, and
wherein each of the plurality of patterns of scan setting data comprises different data.

14. The scanner as in claim 1, wherein each of the plurality of patterns of scan setting data comprise data indicating one or more scan settings, and each of the one or more scan settings represents a characteristic of data obtained from scanning.

15. The scanner as in claim 1, wherein the controller is further configured to execute:
sending a response to the external device via the network, the response comprising each of the created plurality of preview image files.

16. The scanner as in claim 1, wherein the controller comprises:
one or more processors; and
memory storing computer-executable instructions that, when executed by the one or more processors, cause the one or more processors to function as the controller.

17. The one or more non-transitory computer readable media of claim 7,
wherein the plurality of preview image files respectively correspond to the plurality of patterns of scan setting data, and
wherein each of the plurality of patterns of scan setting data comprises different data.

18. The one or more non-transitory computer readable media of claim 7, wherein each of the plurality of patterns of scan setting data comprise data indicating one or more scan settings, and each of the one or more scan settings represents a characteristic of data obtained from scanning.

19. A scanner comprising:
a scan device;
a storage device configured to store a plurality of patterns of scan setting data, and a plurality of preview image files corresponding to the plurality of patterns of scan setting data; and
a controller configured to execute:
causing the scan device to perform a pre-scan so as to obtain pre-scan data from the scan device;
creating, using the pre-scan data, the plurality of preview image files corresponding to the plurality of patterns of scan setting data stored in the storage device, wherein in each of the plurality of preview image files, a corresponding pattern of scan setting data among the plurality of scan setting data is reflected;

storing the created plurality of preview image files in the storage device in a manner in which the plurality of preview image files are viewable by an external device via a network;

receiving, from the external device via the network, an acquisition request for one preview image file which is selected from among the plurality of preview image files;

causing the scan device to start performing a precise scan when the acquisition request is received from the external device via the network, so as to create a precise scan image file in which a pattern of scan setting data corresponding to the one preview image file among the plurality of patterns of scan setting data is reflected; and sending the created precise scan image file to the external device via the network, wherein the plurality of preview image files includes:
  a first preview image file which reflects a first pattern of scan setting data including a first combination of scan parameters designating a scan resolution and a scan color; and
  a second preview image file which reflects a second pattern of scan setting data including a second combination of scan parameters designating a scan resolution and scan color, the second combination being different from the first combination.

20. One or more non-transitory computer readable media storing computer-executable instructions that, when executed by one or more processors of an apparatus, cause the apparatus to:

perform a pre-scan so as to obtain pre-scan data from a scan device;

create, using the pre-scan data, a plurality of preview image files corresponding to a plurality of patterns of scan setting data, wherein in each of the plurality of preview image files, a corresponding pattern of scan setting data among the plurality of scan setting data is reflected;

store the created plurality of preview image files in a manner in which the plurality of preview image files are viewable by an external device via a network;

receive, from the external device via the network, an acquisition request for one preview image file which is selected from among the plurality of preview image files;

cause the scan device to start performing a precise scan when the acquisition request is received from the external device via the network, so as to create a precise scan image file in which a pattern of scan setting data corresponding to the one preview image file among the plurality of patterns of scan setting data is reflected; and send the created precise scan image file to the external device via the network, wherein the plurality of preview image files includes:
  a first preview image file which reflects a first pattern of scan setting data including a first combination of scan parameters designating a scan resolution and a scan color; and
  a second preview image file which reflects a second pattern of scan setting data including a second combination of scan parameters designating a scan resolution and scan color, the second combination being different from the first combination.

* * * * *